United States Patent
Kawada et al.

(10) Patent No.: US 11,046,384 B2
(45) Date of Patent: Jun. 29, 2021

(54) VEHICLE PSEUDO-EMOTION GENERATING SYSTEM AND CONVERSATION INFORMATION OUTPUT METHOD

(71) Applicant: KAWASAKI JUKOGYO KABUSHIKI KAISHA, Kobe (JP)

(72) Inventors: Hisanosuke Kawada, Kobe (JP); Masayuki Enomoto, Kobe (JP); Daisuke Kawai, Kobe (JP); Kazuhiro Ichikawa, Kobe (JP); Masanori Kinuhata, Kobe (JP); Hiroshi Ishii, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 16/604,493

(22) PCT Filed: Apr. 2, 2018

(86) PCT No.: PCT/JP2018/014159
§ 371 (c)(1),
(2) Date: Oct. 10, 2019

(87) PCT Pub. No.: WO2018/190178
PCT Pub. Date: Oct. 18, 2018

(65) Prior Publication Data
US 2020/0156725 A1    May 21, 2020

(30) Foreign Application Priority Data
Apr. 12, 2017 (JP) .............. JP2017-078968

(51) Int. Cl.
*B62J 50/22* (2020.01)
*B62J 6/24* (2020.01)

(52) U.S. Cl.
CPC .............. *B62J 50/22* (2020.02); *B62J 6/24* (2020.02)

(58) Field of Classification Search
None
See application file for complete search history.

(56) References Cited

U.S. PATENT DOCUMENTS

| 6,175,772 | B1 * | 1/2001 | Kamiya | F24F 11/62 700/31 |
| RE44,854 | E * | 4/2014 | Henderson | B62K 5/10 280/124.103 |
| 8,909,370 | B2 * | 12/2014 | Stiehl | B25J 13/081 700/245 |
| 2001/0001318 | A1 * | 5/2001 | Kamiya | F24F 11/30 700/246 |

(Continued)

FOREIGN PATENT DOCUMENTS

| CN | 101654131 B | * 10/2012 | ............ B62J 6/05 |
| JP | H10289006 A | 10/1998 | |

(Continued)

*Primary Examiner* — Fekadeselassie Girma
(74) *Attorney, Agent, or Firm* — Alleman Hall Creasman & Tuttle LLP

(57) ABSTRACT

A pseudo-emotion generating system configured to generate pseudo-emotions of a vehicle includes an emotion generating section that generates a pseudo-emotion of the vehicle based on external force information representing an external force applied to the vehicle from outside during travel of the vehicle.

12 Claims, 6 Drawing Sheets

(56) References Cited

U.S. PATENT DOCUMENTS

| | | | |
|---|---|---|---|
| 2002/0019678 A1* | 2/2002 | Mizokawa | G10L 13/033 700/94 |
| 2003/0060937 A1* | 3/2003 | Shinada | G01C 21/3641 701/1 |
| 2003/0172728 A1* | 9/2003 | Gustafsson | B60T 8/1725 73/146 |
| 2005/0197765 A1* | 9/2005 | Kido | B62J 23/00 701/29.1 |
| 2007/0209854 A1* | 9/2007 | Ho | B62K 5/08 180/210 |
| 2009/0102631 A1* | 4/2009 | Aoki | B60R 21/0136 340/436 |
| 2011/0006914 A1* | 1/2011 | Tsuda | H04W 16/30 340/905 |
| 2011/0043635 A1* | 2/2011 | Fujita | B60W 40/09 348/149 |
| 2011/0288871 A1* | 11/2011 | Suzuki | G10L 15/22 704/275 |
| 2016/0221625 A1* | 8/2016 | Slaughter | B62J 6/01 |
| 2019/0276036 A1* | 9/2019 | Noguchi | B60W 40/02 |
| 2020/0130701 A1* | 4/2020 | Tokunaga | B60W 40/08 |

FOREIGN PATENT DOCUMENTS

| | | | |
|---|---|---|---|
| JP | 2003072488 A | | 3/2003 |
| JP | 2005225484 A | | 8/2005 |
| JP | 2005306305 A | * | 11/2005 |
| JP | 2013103664 A | | 5/2013 |
| WO | 2010084580 A1 | | 7/2010 |

\* cited by examiner

VEHICLE PSEUDO-EMOTION GENERATING SYSTEM AND CONVERSATION INFORMATION OUTPUT METHOD

TECHNICAL FIELD

The present invention relates to a system configured to generate pseudo-emotions of a vehicle and a method for outputting conversation information to the driver of the vehicle.

BACKGROUND ART

Patent Literature 1 discloses a controller that generates pseudo-emotions of a motorcycle. This controller includes basic emotion models classified according to the type of emotions to be expressed by the motorcycle. Information related to the state of the motorcycle itself is input to the controller. The controller generates pseudo-emotions of the motorcycle based on the input information and the basic emotion models. The travel speed, the engine speed, the engine temperature, and the remaining amount of fuel are disclosed as the "information related to the motorcycle itself".

CITATION LIST

Patent Literature

Patent Literature 1: Japanese Laid-Open Patent Application Publication No. H10-289006

SUMMARY OF INVENTION

Technical Problem

However, the "information related to the motorcycle itself" as disclosed in Patent Literature 1 is merely basic information representing the behavior of the motorcycle. With the above controller, simple vehicle behaviors can only be reflected in pseudo-emotions, and generation of a wide variety of pseudo-emotions may be impossible.

It is therefore an object of the present invention to provide a vehicle pseudo-emotion generating system capable of generating a wider variety of pseudo-emotions and a method enabling output of a wider variety of conversation information.

Solution to Problem

A vehicle pseudo-emotion generating system according to an aspect of the present invention is a system configured to generate pseudo-emotions of a vehicle, the system including an emotion generating section that generates a pseudo-emotion of the vehicle based on external force information representing an external force applied to the vehicle from outside during travel of the vehicle.

With the above configuration, external forces applied to the vehicle from outside, or changes in vehicle body behavior caused by the applied external forces can be taken into consideration to generate a wide variety of pseudo-emotions. The generation of a wide variety of pseudo-emotions is easy particularly when the vehicle is a straddle vehicle which is relatively susceptible to external forces (e.g., the vehicle body behavior undergoes relatively large changes due to external forces).

The external force information may include driver-derived external force information representing an external force applied to the vehicle by a driver during travel of the vehicle.

With this configuration, external forces applied to the vehicle by the driver or changes in vehicle body behavior caused by the applied external forces can be taken into consideration to generate a wide variety of pseudo-emotions.

The vehicle may be operable to turn a corner in a state where a vehicle body of the vehicle is leaned, and the driver-derived external force information may include information related to a torque applied by the driver about a steering axis.

For the vehicle whose vehicle body is leaned during cornering, the torque applied by the driver about the steering axis has a significant influence on the vehicle body behavior. With the above configuration, the influence of the torque can be taken into consideration to generate a wide variety of pseudo-emotions.

The driver-derived external force information may include information related to a force applied to the vehicle body upon a change in posture of the driver.

With this configuration, when the vehicle is one for which a change in posture of the driver causes a change in posture of the vehicle body or a shift of the center of gravity of the whole moving entity including the driver and the vehicle and exerts a large influence on the vehicle body behavior, the resulting change in vehicle body behavior can be taken into consideration to generate a wide variety of pseudo-emotions.

The external force information may include ground surface-derived external force information representing an external force applied to a ground-contacting portion of the vehicle from a ground surface during travel of the vehicle.

With this configuration, when the vehicle is one whose vehicle body behavior is susceptible to forces applied to the vehicle from the ground surface, emotion generation can be carried out based on the ground surface-derived external force information to generate a wide variety of pseudo-emotions depending on the condition of the ground surface-contacting portion.

The vehicle may be operable to turn a corner in a state where a vehicle body of the vehicle is leaned, and the external force information may include: information related to a torque applied by a driver about a steering axis; and ground surface-derived external force information representing an external force applied to a ground-contacting portion of the vehicle from a ground surface during travel of the vehicle.

With this configuration, a wide variety of pseudo-emotions can be generated depending on the vehicle body behavior.

The system may further include a skill evaluating section that evaluates driving skill of a driver, and the emotion generating section may generate the pseudo-emotion of the vehicle based on the driving skill evaluated by the skill evaluating section.

With this configuration, the pseudo-emotion of the vehicle can be varied with improvement of the skill of the driver.

A conversation information output method according to an aspect of the present invention is a method for outputting conversation information to a driver driving a vehicle, the method including: acquiring external force information representing an external force applied to the vehicle from outside during travel of the vehicle; and outputting conversation information based on the acquired external force information.

Advantageous Effects of Invention

The present invention can provide a vehicle pseudo-emotion generating system capable of generating a wider variety of pseudo-emotions and a method for outputting a wider variety of conversation information.

DESCRIPTION OF EMBODIMENTS

Hereinafter, embodiments will be described with reference to the drawings. Throughout the drawings, the same or equivalent elements are denoted by the same reference signs, and detailed descriptions of such elements will not be repeated.

Figure 1:
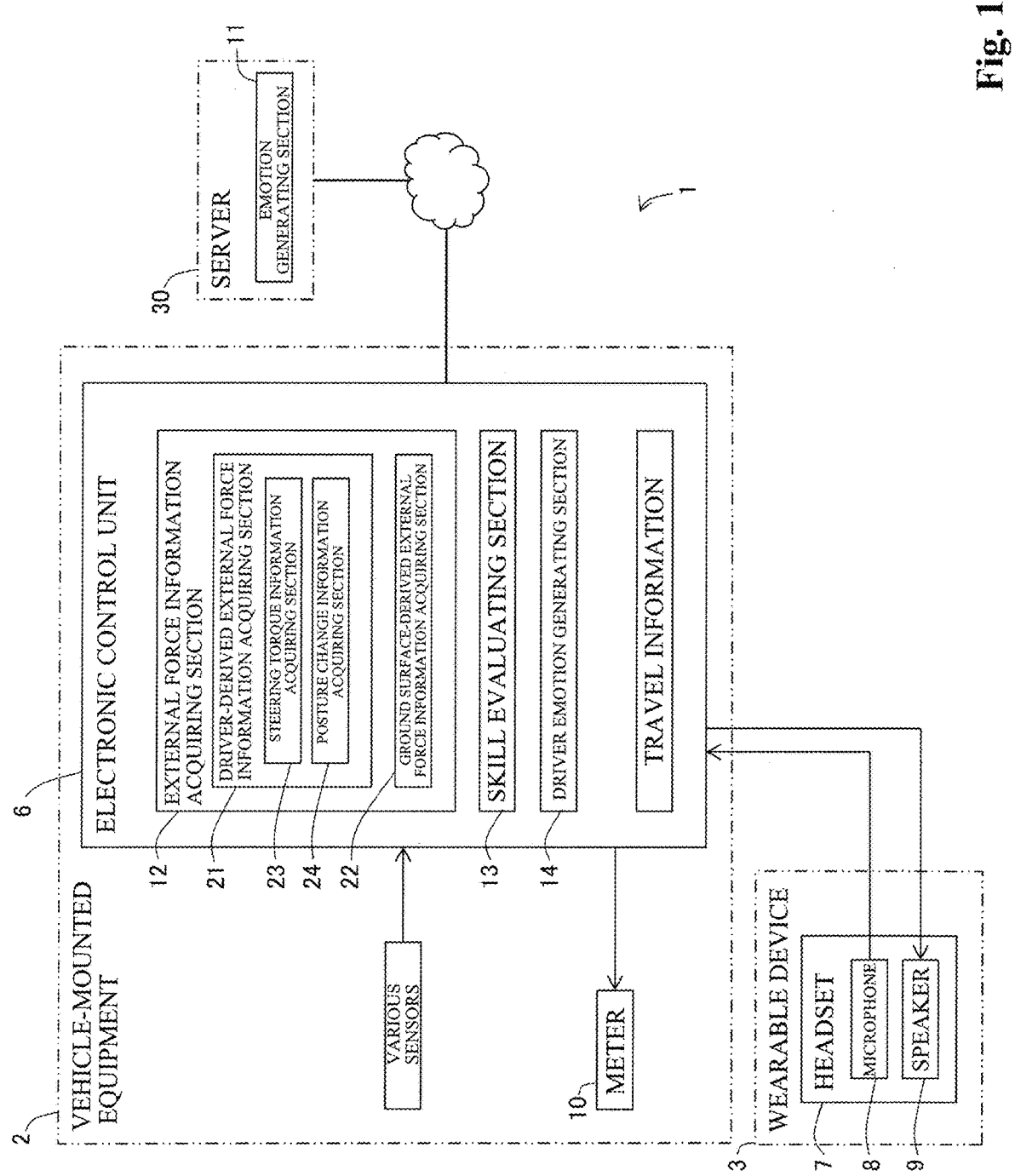
FIG. 1 is a configuration diagram of a pseudo-emotion generating system according to a first embodiment.

FIG. 1 is a configuration diagram of a pseudo-emotion generating system 1 according to a first embodiment. In the present embodiment, a straddle vehicle including a seat straddled by the driver is illustrated as an exemplary vehicle. In particular, the straddle vehicle is a motorcycle having one front wheel and one rear wheel and incorporating a drive source for driving one of the wheels (e.g., the rear wheel). In the following description, an engine having an intake system equipped with a variable throttle valve is illustrated as the drive source. However, an electric motor may be used as the drive source instead of the engine.

Straddle vehicles, or motorcycles which are an example of straddle vehicles, are susceptible to external forces applied from the outside of the vehicle bodies. Motorcycles are also a typical example of a vehicle that turns a corner in a state where its vehicle body is leaned with respect to a front-rear axis passing through the point of contact of the front wheel with the ground and the point of contact of the rear wheel with the ground. The force exerted on the wheels from the ground surface varies depending on parameters related to the leaning motion of the vehicle body (such as, in particular, the vehicle body leaning angle, the vehicle body leaning angular velocity, and the vehicle body leaning angular acceleration).

The configuration of the pseudo-emotion generating system 1 will be described in terms of hardware. The pseudo-emotion generating system 1 includes at least vehicle-mounted equipment 2 mounted in the motorcycle. The vehicle-mounted equipment 2 includes an electronic control unit 6 and various sensors. The sensors include an accelerator position sensor that detects the accelerator position, a throttle position sensor that detects the throttle position, an engine speed sensor that detects the engine speed, a vehicle speed sensor that detects the vehicle body speed, a water temperature sensor that detects the temperature of engine cooling water, a distance sensor that detects the inter-vehicle distance, a front brake pressure sensor that detects the front wheel brake pressure, a rear brake pressure sensor that detects the rear wheel brake pressure, a fuel amount sensor that detects the remaining amount of fuel, and a leaning angle sensor that detects the vehicle body leaning angle.

The pseudo-emotion generating system 1 may include a server 30 connected to the vehicle-mounted equipment 2 via the Internet. In this case, the server 30 is connected to the electronic control unit 6 included in the vehicle-mounted equipment 2 in such a manner that two-way communication can be established between the electronic control unit 6 and the server 30.

The pseudo-emotion generating system 1 may include a wearable device 3 wirelessly connected to the vehicle-mounted equipment 2 by a technology such as Bluetooth (registered trademark) and adapted to be worn by the driver. The wearable device 3 includes a headset 7 including a microphone 8 and a speaker 9. The headset 7 may be built in a helmet. In this case, the microphone 8 and the speaker 9 are connected to the electronic control unit 6 included in the vehicle-mounted equipment 2. The microphone 8 senses an utterance of the driver, and the voice information is output to the electronic control unit 6. The speaker 9 outputs voice information generated by the electronic control unit 6.

The pseudo-emotion generating system 1 includes an emotion generating section 11 that generates pseudo-emotions of the motorcycle based on "emotion source information". The emotion source information is information used by the emotion generating section 11 for generation of pseudo-emotions.

In the present embodiment, the emotion source information includes travel information of the motorcycle, external force information representing an external force applied to the motorcycle from outside during travel of the motorcycle, driving skill information representing the driving skill of the driver, and driver emotion information representing the emotion of the driver. The emotion generating section 11 generates pseudo-emotions of the motorcycle at least based on the external force information.

"Pseudo-emotion" may be vehicle emotion information representing "comfort" or "discomfort", may be vehicle emotion information representing "delight", "anger", "sadness", or "enjoyment", may be vehicle emotion information representing "like" or "dislike", or may be vehicle emotion information representing "repression" or "release". Pseudo-emotions can be paraphrased as emotions which would arise in a motorcycle if it were a living creature. Motorcycles are often compared to horses, and the pseudo-emotion generating system 1 can give a reality to this comparison. The driver is notified of the vehicle emotion information representing a pseudo-emotion. Thus, the vehicle emotion information is notification information provided to the driver. The driver can recognize the pseudo-emotion of the motorcycle from the notification information, and can feel as if he/she were riding on a living creature (e.g., a horse).

The present specification does not provide a detailed description of how the emotion generating section 11 generates pseudo-emotions based on the emotion source information, in particular of an emotion generation program, emotion generation logic, or emotion generation engine used for the generation of pseudo-emotions.

The travel information includes information representing the travel state of the vehicle body (vehicle body behavior). The travel state may include internal information detected for engine control during travel. The travel information may include information representing a warning about the vehicle body. The travel information may include information representing an operation command given by the driver to the vehicle body for the purpose of a driving operation. The travel information may include information representing an operation command given by a vehicle controller for the purpose of vehicle body control. The travel information includes information representing a phenomenon occurring in the vehicle body during travel. The travel information includes information representing the accelerator position, the vehicle body speed, the vehicle body acceleration in the forward/rearward direction, the vehicle body acceleration in the rightward/leftward direction, the temperature of a coolant for cooling the drive source (e.g., the temperature of engine cooling water), the inter-vehicle distance (distance between the driver's vehicle and another vehicle traveling ahead), the front wheel brake pressure, the rear wheel brake pressure, the remaining charge of the battery, the throttle position, the remaining amount of fuel, the engine speed, the yaw rate, or the vehicle body leaning angle. Any of these information can be acquired using a known sensor and, therefore, the means and configuration for information acquisition are not described in detail.

The external force information refers to information related to a force [newton] or torque [newton—meter] applied to the vehicle from outside. The external force information may include not only the magnitude of the force or torque but also the change in magnitude over time, the direction of the force or torque, and the change in direction over time, and may include information combining these parameters. The external force information includes driver-derived external force information representing an external force applied to the motorcycle by the driver and ground surface-derived external force information representing an external force applied to a ground surface-contacting portion (typically, a tire tread) of the motorcycle from the ground surface. The driver-derived external force information includes information related to a torque τ (see FIG. 2) applied by the driver about a steering axis AS (see FIG. 2). This information will hereinafter be referred to as "steering torque information" for convenience of explanation. The driver-derived external force information includes information related to the change in posture of the driver. This information will hereinafter be referred to as "posture change information" for convenience of explanation.

The pseudo-emotion generating system 1 includes an external force information acquiring section 12 that acquires the external force information described above, a skill evaluating section 13 that evaluates the driving skill of the driver and acquires the driving skill information, and a driver emotion information acquiring section 14 that acquires the driver emotion information representing the emotion of the driver. The external force information acquiring section 12 includes a driver-derived external force information acquiring section 21 that acquires the driver-derived information and a ground surface-derived external force information acquiring section 22 that acquires the ground surface-derived external force information. The driver-derived external force information acquiring section 21 includes a steering torque information acquiring section 23 that acquires the steering torque information and a posture change information acquiring section 24 that acquires the posture change information.

As the driver-derived external force there may be applied an external force that occurs due to weight shift of the driver. For example, a seat load sensor or a driver position sensor may be used to detect changes in weight shift of the driver in the forward/rearward direction and the rightward/leftward direction. A centrifugal force acting on the vehicle body during cornering may be detected, and a posture change made by the driver in the rightward/leftward direction in response to the centrifugal force may be calculated from the detected value of the centrifugal force. Changes in stroke of the suspensions of the front and rear wheels may be detected, and a posture change of the driver in the forward/rearward direction may be calculated from the detected values of the changes in stroke of the suspensions. Additionally, a force applied by the driver to press a step or a force applied by the driver to raise the handle upward or push the handle downward may be detected, and conversation information may be output based on the detected value of the force. For example, when a weight shift significantly larger than an average value is detected, it may be determined that the driver has intentionally shifted his/her weight, and the conversation information to be output may be varied.

Figure 2:
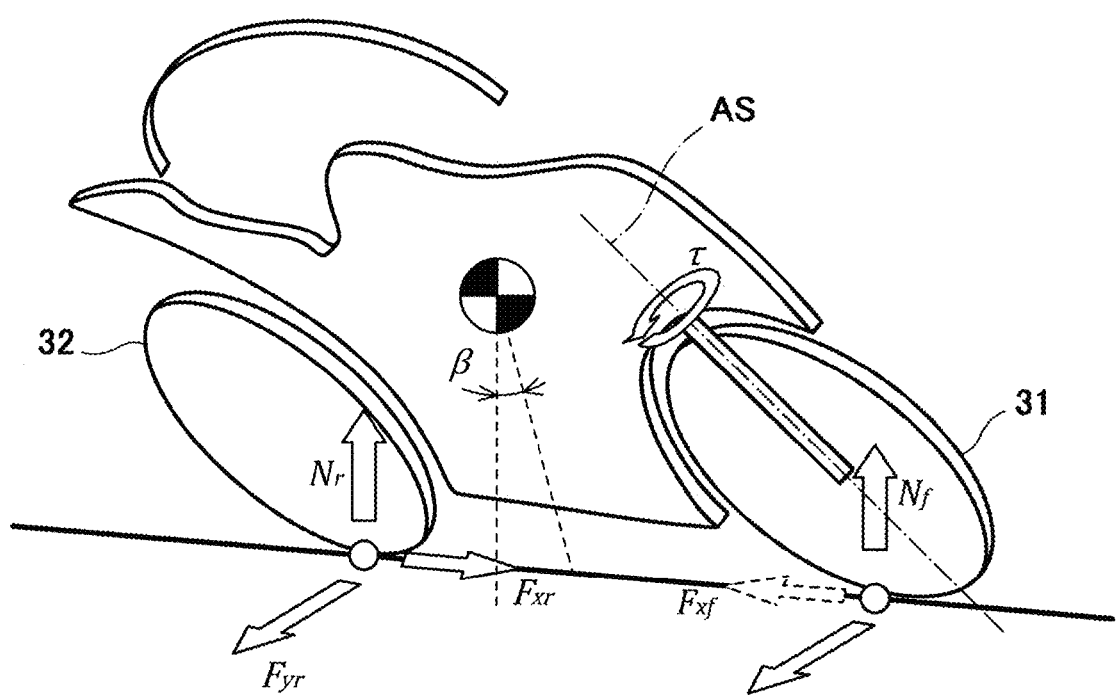
FIG. 2 is a diagram illustrating ground surface-derived external force information and steering torque information.

FIG. 2 is a diagram illustrating the ground surface-derived external force and the steering torque. The ground surface-derived external force information acquiring section 22 detects a ground surface-derived external force (which may be referred to as a tire force or wheel force). The ground surface-derived external force may act in the forward/rearward direction or the rightward/leftward direction or may act in the upward/downward direction. The ground surface-derived external force may be a force acting about an axis extending in any of the above directions. The "ground surface-derived external force" includes a front wheel longitudinal force $F_{xf}$ acting on the front wheel 31 in the forward/rearward direction, a front wheel lateral force $F_{yf}$ acting on the front wheel 31 in the rightward/leftward direction, a front wheel vertical force $N_f$ acting in the vertical direction, a rear wheel longitudinal force $F_{xr}$ acting on the rear wheel 32 in the forward/rearward direction, a rear wheel lateral force $F_{yr}$ acting on the rear wheel 32 in the rightward/leftward direction, a rear wheel vertical force Nr acting on the rear wheel 32 in the vertical direction, a resultant of these forces (e.g., a resultant of the rear wheel longitudinal force $F_{xr}$ and the rear wheel lateral force $F_{yr}$), and a sum of these forces (e.g., a sum of the front wheel longitudinal force $F_{xf}$ and the rear wheel longitudinal force $F_{xr}$). The ground surface-derived external force information may be estimated based on detection results obtained by strain gauges provided on the wheels. Instead of directly detecting an external force by means such as a strain gauge, a parameter representing a change in vehicle body behavior, such as the acceleration in the forward/rearward direction, the vehicle body leaning angle (3, or the time rate of change in the vehicle body leaning angle β (leaning angular velocity or leaning angular acceleration) may be detected, and a ground surface-derived external force as the possible cause of the change in vehicle body behavior may be estimated from the detected parameter. Thus, the ground surface-derived external force may be acquired directly or indirectly. When acquiring the ground surface-derived external force information indirectly, the ground surface-derived external force information acquiring section 22 estimates the ground surface-derived external force also based on design parameters of the vehicle and the total weight of the vehicle body, the driver, and the loads carried by the vehicle. Since the ground surface-derived external force acting on the front wheel and the ground surface-derived external force acting on the rear wheel are separately determined, conversation information matching the ground surface-derived external force acting on the front wheel and conversation information matching the ground surface-derived external force acting on the rear wheel can be output. This allows a wider variety of responses.

The steering torque information acquiring section 23 acquires the steering torque information. The steering torque τ may be directly detected by a torque sensor or load cell provided in the vicinity of the head pipe (the torque sensor may constitute the steering torque information acquiring section 23). The steering torque τ may be estimated based on the acquired ground surface-derived external force (the steering torque information acquiring section 23 may estimate the steering torque τ based on the ground surface-derived external force).

Figure 3B:
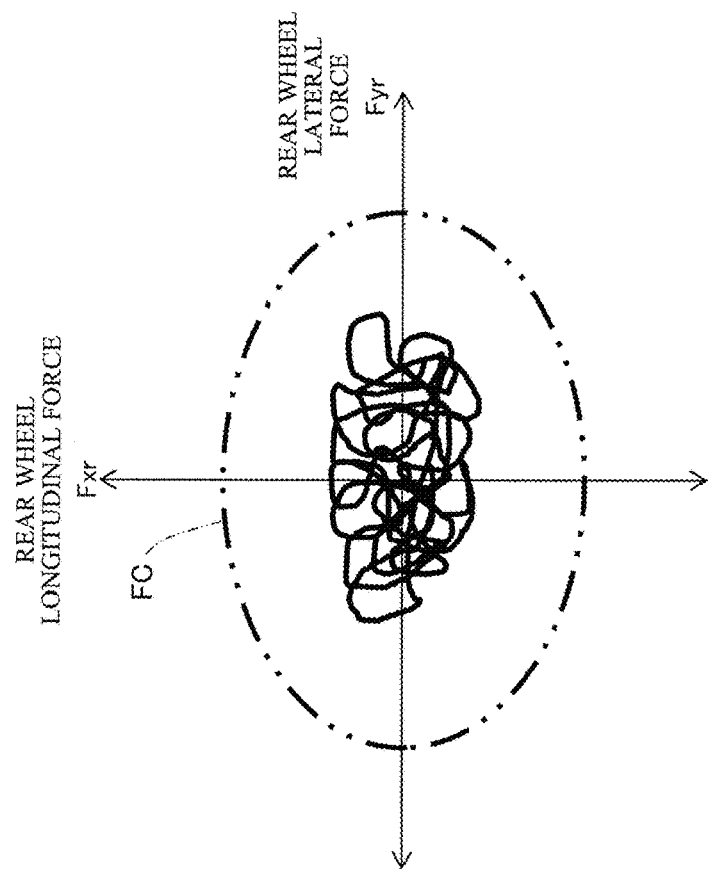
FIG. 3B is a scatter diagram showing time-series data of ground surface-derived external force information acquired when a beginning driver drives a vehicle.
Figure 3A:
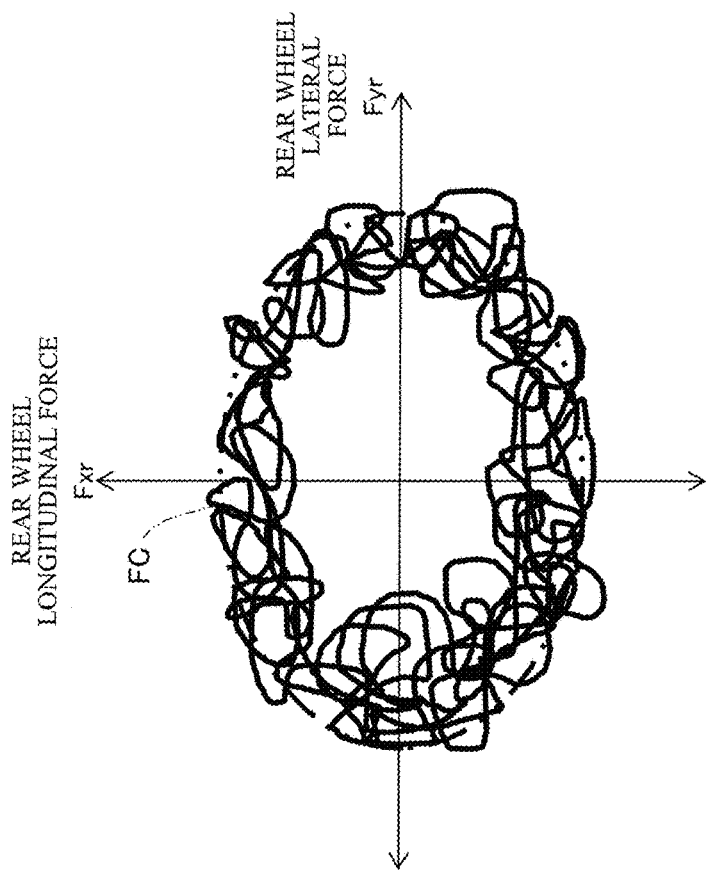
FIG. 3A is a scatter diagram showing time-series data of ground surface-derived external force information acquired when a skilled driver drives a vehicle.

FIG. 3A shows a time history of the ground surface-derived external force information acquired when a driver of high driving skill operates the motorcycle, and FIG. 3B shows a time history of the ground surface-derived external force information acquired when a beginning driver operates the motorcycle. The skill evaluating section 13 may evaluate the driving skill, for example, based on the ground surface-derived external force information acquired by the ground surface-derived external force information acquiring section 22, in particular time-series data of a longitudinal force and a lateral force exerted on the drive wheel from the ground surface or time-series data of a resultant of these two forces. As shown in FIG. 3A, the driver of high driving skill can operate the motorcycle in a stable manner such that the ground surface-derived external force generated is around the tire grip limit indicated by a so-called friction circle FC. By contrast, as shown in FIG. 3B, the beginning driver operates the motorcycle in a manner such that the force exerted on the drive wheel from the ground surface is kept small. That is, the beginning driver cannot lean the vehicle body so sharply that the vehicle body is on the verge of skidding, and cannot increase the engine output to a high level such that the drive wheel is on the verge of spinning freely. In view of such driving trends, the driving skill can be evaluated according to a mean or variance statistically derived from the time-series data of the ground surface-derived external force information.

The driver emotion information acquiring section 14 generates driver emotion information representing the emotion of the driver based on voice information representing the contents of a driver's utterance sensed by the microphone 8 of the headset 7. As with pseudo-emotions described above, the driver's emotion may be expressed as driver emotion information representing "comfort" or "discomfort", driver emotion information representing "delight", "anger", "sadness", or "enjoyment", or driver emotion information representing "like" or "dislike".

The emotion generating section 11 generates a pseudo-emotion based on the emotion source information as described above. The driver is notified of the generated pseudo-emotion. The pseudo-emotion generating system 1 includes, for example, the above-mentioned speaker 9 or a meter 10 as a device for notification of pseudo-emotions. The electronic control unit 6 outputs voice information representing the generated pseudo-emotion as notification information to the speaker 9. The speaker 9 emits the voice information, and notifies the driver of the pseudo-emotion of the motorcycle by appealing to the sense of hearing of the driver. The electronic control unit 6 outputs visual information representing the pseudo-emotion as notification information to the meter 10. The meter 10 displays the visual information and notifies the driver of the pseudo-emotion of the motorcycle by appealing to the sense of vision of the driver.

In the present embodiment, pseudo-emotions are generated based on not only the travel information of the motorcycle but also the external force information. In this case, a stronger emotion of repression may be generated as the external force increases. As the external force decreases, a stronger emotion of comfort may be generated. As the steering torque applied by the driver or the ground surface-derived external force increases, a stronger emotion of discomfort may be generated. As the steering torque or the ground surface-derived external force decreases, a stronger emotion of comfort may be generated. By thus using external forces as parameters for pseudo-emotion generation, emotions which would arise in a living creature subjected to the external forces can be set as pseudo-emotions.

Alternatively, pseudo-emotions may be set based on how an external force changes over time (the time rate of change in the external force). When the magnitude of the steering torque is large but the change in steering torque over time is small (when a relatively large steering torque is continuously applied, such as during steady cornering for a relatively long time), a strong emotion of comfort may be set.

When vehicle emotion information representing "discomfort" has been generated as a pseudo-emotion, utterances emitted from the speaker 9 may assume a negative tone or the number of utterances may be reduced. When vehicle emotion information representing "comfort" has been generated as a pseudo-emotion, the number of utterances emitted from the speaker 9 may be increased.

The external force information includes the driver-derived external force information representing external forces applied to the vehicle by the driver during travel of the vehicle. Thus, external forces applied to the vehicle by the driver or changes in vehicle body behavior caused by the applied external forces can be taken into consideration to generate a wide variety of pseudo-emotions.

The system further includes the skill evaluating section which evaluates the driving skill of the driver, and the emotion generating section generates pseudo-emotions of the motorcycle based on the driving skill evaluated by the skill evaluating section. Thus, pseudo-emotions of the vehicle can be varied with improvement of the skill of the driver.

Straddle vehicles are lighter and smaller than automobiles, and the travel behaviors of straddle vehicles are susceptible to external forces applied from outside. In particular, the vehicle body behavior of a vehicle operable to turn a corner with its vehicle body leaned is significantly affected by external forces since the amount of leaning of the vehicle body of such a vehicle changes with a change in posture of the driver. In the present embodiment, emotion generation is executed based on external forces which affect the behavior of the vehicle, and this makes it possible to generate different emotions for the situations where the result (actual behavior) is the same. Thus, the variety of conversation information can be increased, and the driver can be prevented from easily getting bored of conversation information.

Additionally, since conversation information can be generated before the vehicle body behavior actually changes upon application of an external force, the conversation information can be output earlier, and conversation with the driver is likely to be made at an appropriate timing, so that artificiality of the conversation can be reduced.

As described above, in an example where pseudo-emotions are varied according to the external force applied to the vehicle by the driver or from the ground surface, an emotion which would arise in the vehicle if it were a living creature may be set as a pseudo-emotion. For example, when an external force applied by the driver abruptly changes, such as in the case where the weight shift in the rightward/leftward direction abruptly changes, conversation information reflecting the emotion of fatigue may be output. Conversely, when an external force applied by the driver is small or the change in the external force is mild, conversation information reflecting the emotion of comfort may be output.

The emotion of the driver may be inferred from an external force applied by the driver, and the inferred emotion may be reflected in conversation information. The manner in which the driver applies an external force is a factor which is significantly dependent on the emotion of the driver. For example, when the external force applied by the driver is strong and it is determined that the burden on the driver is heavy, conversation information intended to appreciate the effort of the driver may be output, or conversation information intended to recommend the driver to take a rest may be output. The degree of fatigue of the driver may be evaluated from the trend of external force application, and conversation information matching the degree of fatigue of the driver may be output. When it is determined from the trend of external forces that the driver is energetic enough, conversation information expressing empathy for the driver may be output. In this manner, the emotion of the driver may be inferred from an external force applied by the driver, and conversation information expressing empathy for the emotion of the driver may be output. Different emotions can be generated depending on the intensity of the force application by the driver (the manner in which the driver applies an external force).

When the ground surface-derived external force is small (namely when the frictional force is small), an emotion of discomfort may be generated since in this case drive force and brake force tend not to be reflected in the vehicle behavior. When the ground surface-derived external force is more than a predetermined level, an emotion of discomfort may be generated since in this case wheel slip or skidding can occur.

Additionally, since the front wheel and the rear wheel are separately subjected to ground surface-derived external forces, a much wider variety of conversation information can be generated. When the margin to the limit defined by the friction circle is large, an emotion of comfort may be generated. When an operation which increases the margin to the limit defined by the friction circle is performed, such as when an operation which increases the normal force is performed, an emotion of comfort may be generated. When the driver performs a weight shift appropriate for the turning radius or centrifugal force during cornering to provide an external force pattern such that the vehicle body can turn the corner smoothly, an emotion of comfort may be generated. For example, when the driver exhibits high cornering performance by entering the corner in a lean-in posture and exiting the corner in a lean-out posture, an emotion of comfort may be generated.

In the case of an emotion of discomfort, the number of utterances may be decreased. In the case of an emotion of comfort, the number of utterances may be increased.

For emotion generation, not only external forces applied by the driver but also operation information about operations of the vehicle by the driver may be taken into consideration. This allows generation of a much wider variety of emotions. By taking into consideration both the operation information and the driver-derived external force, for example, emotions which would arise in the vehicle if it were a living creature can more easily be set as pseudo-emotions. Additionally, the emotion of the driver can be inferred in more detail, and it is made easier to provide a conversation suitable for the emotion of the driver.

When the driver-derived external force or the ground surface-derived external force is small, conversation information may be output, and the number of times of output of conversation information may be increased. Thus, conversation information output can be executed in a situation where the driver is supposed to perform no complicated operation (such as when the driver is in a relaxed state). Conversely, when the driver-derived external force is large or changes rapidly, no conversation information may be output, or the number of times of output of conversation information may be decreased, or conversation information dedicated for the case of a large external force may be generated. Thus, the amount of conversation may be reduced during a complicated driving operation, or conversation information intended to assist the driving operation may be provided. In this manner, the output timing of conversation information can be set according to how external forces are applied, and a response can be made at a timing when the driver can easily discern the response.

Since pseudo-emotions can be generated based on both the steering torque and the ground surface-derived external force information, the intention and comfort of the driver operating a vehicle whose vehicle body is leaned during travel can be accurately inferred. Generating emotions based on the inference results makes it easier to output various and suitable responses at appropriate times.

Conversation information is preferably delivered as a voice. However, conversation information may be delivered in a form other than a voice. For example, conversation information may be delivered as an image displayed in a meter display device. It is not necessary to send conversation information to the server.

Figure 4:
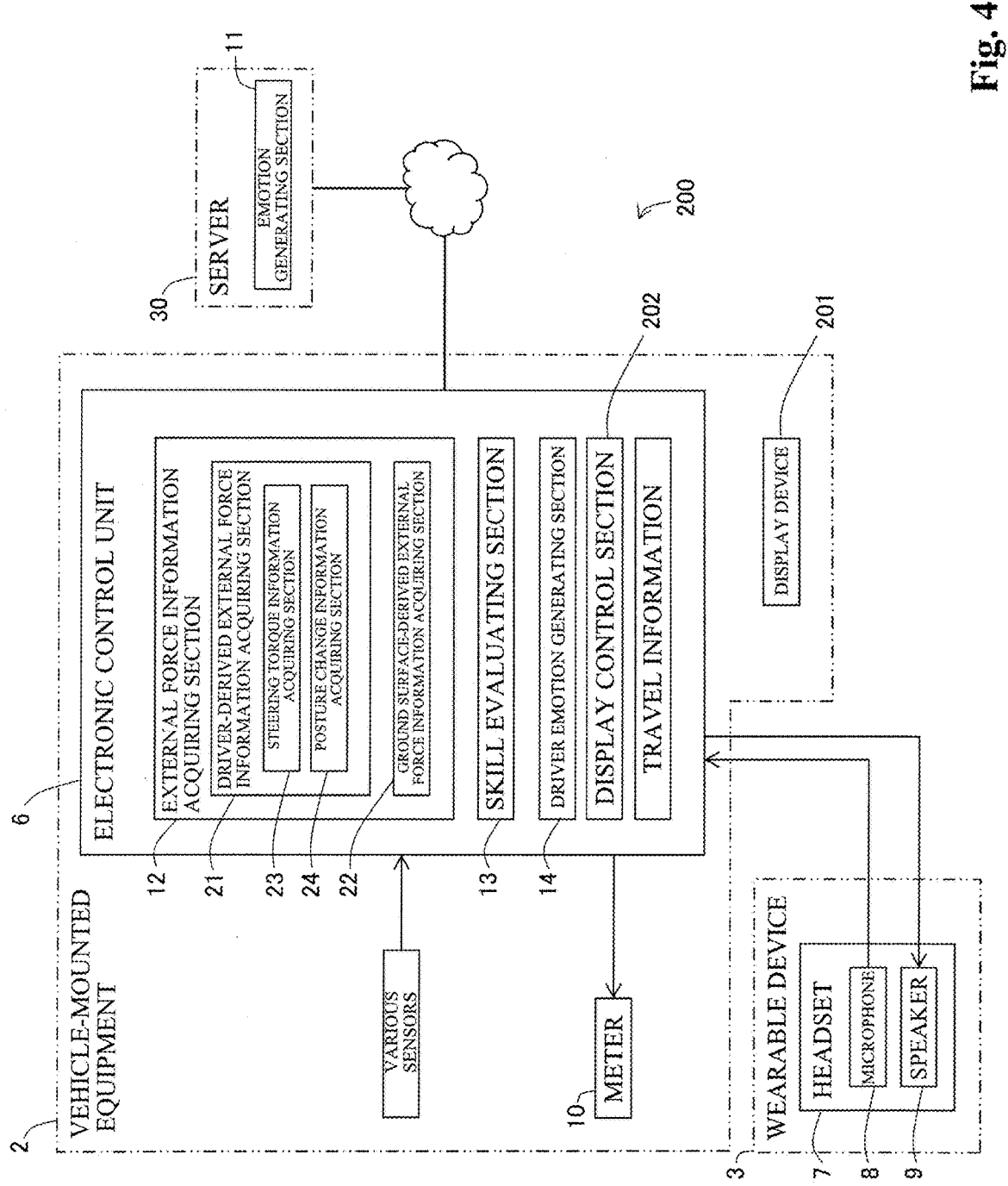
FIG. 4 is a configuration diagram of a pseudo-emotion generating system according to a second embodiment.

As shown in FIG. 4, a pseudo-emotion generating system 200 according to a second embodiment includes a display device 201 and a display control section 202. The display device 201 is a device configured to send visual information to the driver. The display device is controlled by the display control section of the control unit so as to display different illumination patterns depending on the type of pseudo-emotion. When information is delivered in an illumination pattern, the driver can more intuitively understand the information than when the driver visually recognizes and understands textual information. In particular, when information representing an emotion is handled, delivering the information in an illumination pattern is beneficial because the delivery of the information in an illumination pattern allows more intuitive understanding than the delivery of the information in the form of words.

The parameters defining illumination patterns include color, brightness, geometry (the shape and size of a graphic), and motion (change over time). Various illumination patterns can be generated by combinations of these parameters, and a change in at lease one of the parameters provides a different illumination pattern. For example, it is possible to generate a pattern consisting of a small, dark red circle whose diameter alternately increases and decreases and a pattern consisting of a straight bright blue line which blinks. Illumination patterns are not information represented by words but are non-linguistic information or graphical information (dynamic or static). Information displayed by the display device 201 is information which has no direct influence on driving operations unlike information displayed by an instrument (meter) unit 211 (see FIG. 5) or which has less influence on driving operations than information displayed by the instrument unit 211. It is preferable that the "motion (change over time)" as one of the parameters defining illumination patterns, or a change in illumination pattern associated with a change in information to be delivered, be intuitively or sensuously recognizable by the driver.

Illumination patterns are preferably recognizable by the driver looking directly at the traveled road. Human's field of view includes a good-sight region where objects are viewed with a central visual acuity which is relatively high and a poor-sight region where objects are viewed with an eccentric visual acuity which is lower than the central visual acuity. The display device 201 is disposed in a manner such that it lies at least within the poor-sight region of the driver fixing his/her eyes on the traveled road or the instrument unit 211. Illumination patterns (in particular, "brightness" as one of the parameters) and the illumination region (region where the illumination patterns are displayed) are set so that the driver can recognize the illumination patterns and the illumination region even when they are within the poor-sight region of the driver. For example, the illumination region is formed as a region having a larger area than the smallest of display regions assigned to characters in the instrument unit 211. Preferably, the illumination region is formed as a region having a larger area than the largest of the display regions assigned to the characters in the instrument unit 211. Thus, even when the display device 201 lies in the poor-sight region (such as when the driver focuses attention on driving operations with his/her eyes fixed on the traveled road), the displayed contents (what kind of illumination pattern is displayed and what is meant by the delivered information) can be easily and immediately understood.

Since illumination patterns are non-linguistic information, the delivered information can be more intuitively and sensuously recognized than linguistic information consisting of words which need to be read and interpreted to understand the meaning of the information. Even when the illumination region is located outside the good-sight region of the field of view of the driver, the delivered information can more easily be recognized than linguistic information.

In the present embodiment, the display device 201 includes a light emitting section composed of point light sources or surface light sources. The display device 201 can display a plurality of illumination patterns to increase the variety of information (the variety of pseudo-emotions) to be recognized by the driver. As described above, each illumination pattern is defined by color, brightness, geometry, and motion (change over time), and a change in at least one of these parameters provides a different illumination pattern. This can eliminate the undesirable need for increasing the number of illumination regions to enable delivery of a variety of information. For example, it is desirable that the light emitting section be capable of varying the color of emitted light, varying the amount of emitted light, and varying the period at which light emission occurs. Specific examples of the light sources of the light emitting section include, but are not necessarily limited to, light emitting diodes (LED) and organic electroluminescent (EL) devices.

The display device 201 is provided in the vehicle body of the vehicle. Specifically, the display device 201 is disposed at a location such that the driver assuming a driving posture can visually recognize illumination patterns. The display device 201 is connected to the control unit and controlled by the control unit. Specifically, the display device 201 displays different illumination patterns depending on the illumination command given by the control unit.

Figure 5:
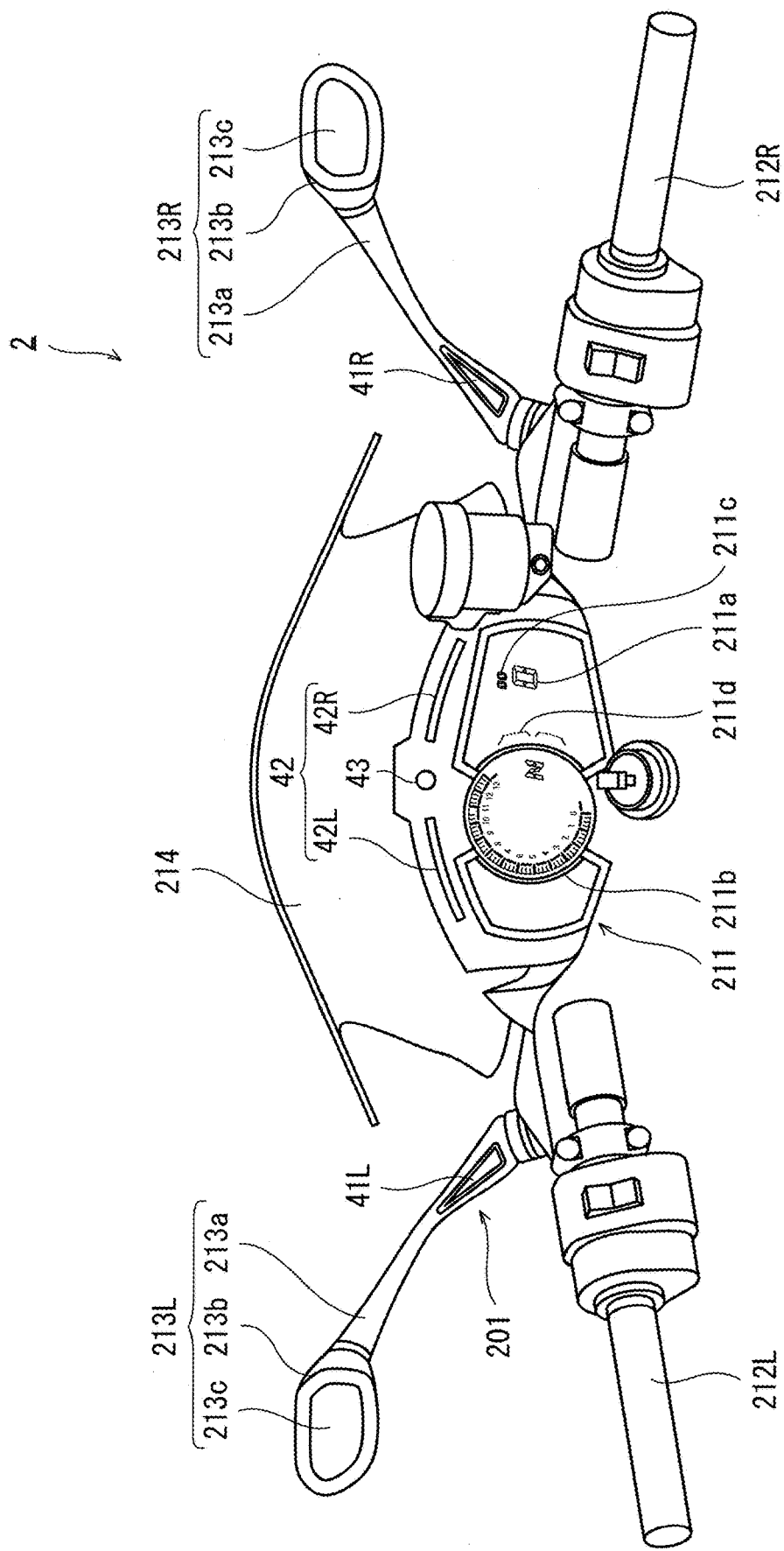
FIG. 5 shows a display device.

FIG. 5 shows an example of the display device 201. A vehicle 2 (e.g., a motorcycle) includes the instrument unit 211 provided at the center in the vehicle width direction. The instrument unit 11 includes a plurality of meters such as a speed meter 11a, a rotational speed meter 11b, a travel distance meter 11c, and a fuel meter 11d, and these meters are closely arranged to constitute the unit.

The vehicle 2 includes a pair of left and right handlebars 212L and 212R as a steering device, the handlebars 212L and 212R being configured to be pivotally operated by the driver gripping the handlebars 212L and 212R. In the present example, the handlebars 212L and 212R are disposed outwardly of the instrument unit 211 in the vehicle width direction. The vehicle 2 includes a pair of left and right side mirrors 213L and 213R serving as rearview mirrors for allowing the driver to know the condition of the rearward surroundings located outwardly of the vehicle in the vehicle width direction. The side mirrors 213L and 213R are disposed outwardly of the instrument unit 211 in the vehicle width direction and above the handlebars 212L and 212R. Each of the side mirrors 213L and 213R includes a mirror stay 213a extending substantially upward from the vehicle body, a mirror housing 213b attached to the upper end of the mirror stay 213a, and a mirror 213c enclosed in the mirror housing 213b and having a mirror surface facing rearward.

When driving the vehicle, the driver holds the handlebars 212L and 212R with his/her eyes facing forward of the vehicle, and checks the rearward surroundings of the vehicle with the aid of the side mirrors 213L and 213R while checking the state of the vehicle with the aid of the instrument unit 211. The instrument unit 211 and the side mirrors 213L and 213R are disposed in a manner such that the unit and mirrors can easily been viewed by the driver assuming the driving posture. The vehicle 2 of the present embodiment includes a windshield 214 as a wind blocking member for reducing the wind pressure imposed on the driver during travel. The windshield 214 is composed of a transparent sheet material. The windshield 214 extends substantially upward from the vehicle body and covers the instrument unit 211 from the front.

The display device 201 includes side light units 41L and 41R disposed outwardly of the instrument unit 211 in the vehicle width direction. The side light units 41L and 41R are an example of the light emitting section described above. Each of the side light units 41L and 41R is, for example, a light source device composed of a plurality of LEDs arranged in a line or matrix. Each LED is an RGB full-color LED. The side light units 41L and 41R are paired left and right units, and are arranged symmetrically with respect to the centerline of the vehicle width. In the present example, the paired side light units 41L and 41R are provided on the mirror stays 213a of the paired side mirrors 213L and 213R, respectively. Specifically, each of the side light units 41L and 41R is provided on the rear surface of the mirror stay 13a so that the light emitting surface of the side light unit faces the driver. Each of the side light units 41L and 41R is shaped to extend longitudinally in the upward/downward direction. The mirror stays 213a extend upwardly while being inclined outwardly in the vehicle width direction. Accordingly, the paired side light units 41L and 41R extend in the upward direction with an inclination toward the outside in the vehicle width direction. It is sufficient that each of the side light units 41L and 41R be arranged to present a strip shape extending longitudinally in the upward/ downward direction. In another example, the side light units 41L and 41R may be provided on the two side edges of the windshield in the vehicle width direction. If a windshield stay for supporting the windshield is provided to extend in the upward/downward direction, the side light units 41L and 41R may be provided in the windshield stay.

The display device 201 according to the present embodiment includes front light units 42L and 42R disposed above the display portion of the instrument unit 211. The front light units 42L and 42R are also light source devices each composed of a plurality of LEDs arranged in a line or matrix. Each LED is, for example, an RGB full-color LED. The front light units 42L and 42R are disposed inwardly of the pair of mirror stays 213a in the vehicle width direction and inwardly of the pair of side edges of the windshield in the vehicle width direction. The front light units 42L and 42R are shaped to extend longitudinally in the vehicle width direction and are arranged along the upper edge of the instrument unit 211. In the present example, the front light units 42L and 42R are also paired left and right units and arranged symmetrically with respect to the centerline of the vehicle width. It is sufficient that each of the front light units 42L and 42R be arranged to present a strip shape extending longitudinally in the vehicle width direction. In another example, the front light units 42L and 42R may be disposed at the rear edge of the windshield or below the display portion of the instrument unit 11. For example, the front light units 42L and 42R may be disposed along the lower edge of the instrument unit 211. The front light units 42L and 42R may be provided in an upper bracket or a handle post.

The use of the light units 41L, 41R, 42L and 42R of strip shape can broaden the illumination region. This can improve the visual recognizability of a changed illumination pattern. Additionally, since one of different illumination patterns is selected and displayed, the delivered information can be more clearly understood, albeit smaller in volume, than information delivered in the form of symbols or words.

Each of the side light units 41L and 41R can be operated to present a predetermined dynamic illumination pattern. An example of the dynamic illumination pattern is a meteor-like pattern displayed on the inner surface of the mirror stay by turning on and off the LEDs in order from the upper outermost LED to the lower innermost LED or in the reverse order. Hereinafter, a pattern displayed by turning on and off the LEDs in order from the upper outermost LED to the lower innermost LED will be referred to as "inwardly-moving meteor type", while a pattern displayed by turning on and off the LEDs sequentially in order from the lower innermost LED to the upper outermost LED will be referred to as "outwardly-moving meteor type". Another example of the dynamic illumination pattern is a pattern displayed by performing, at least one time, a series of operations consisting of simultaneous turning on of all of the LEDs and simultaneous turning off of all of the LEDs (this pattern will hereinafter be referred to as "collective blinking type"). The side light units 41L and 41R are paired left and right units. When an illumination pattern of either of the meteor types is used, the side light units 41L and 41R are controlled in a manner such that the turned-on LEDs of the left unit 41L and right unit 41R are at symmetrical locations. When an illumination pattern of the collective blinking type is used, the side light units 41L and 41R are controlled in a manner such that the LEDs of the left unit 41L are turned on and off at the same time as the LEDs of the right unit 41R. Turning on and off of the front light units 42L and 42R can also be controlled to provide dynamic illumination patterns similar to those described above.

The display device 4 according to the present embodiment includes a center light unit 43 disposed on the centerline of the vehicle width. The center light unit 43 is configured to display graphics. The center light unit 43 can vary the graphic to be displayed depending on the pseudo-emotion to be delivered, thereby displaying a plurality of illumination patterns. In the present example, the center light unit 43 can display a plurality of illumination patterns by varying the manner of the motion of the displayed graphic depending on the pseudo-emotion to be delivered. The center light unit 43 includes a small-sized display portion capable of dynamically displaying various graphic patterns. In the present embodiment, the center light unit 43 is disposed between the pair of front light units 42L and 42R.

Figure 6:
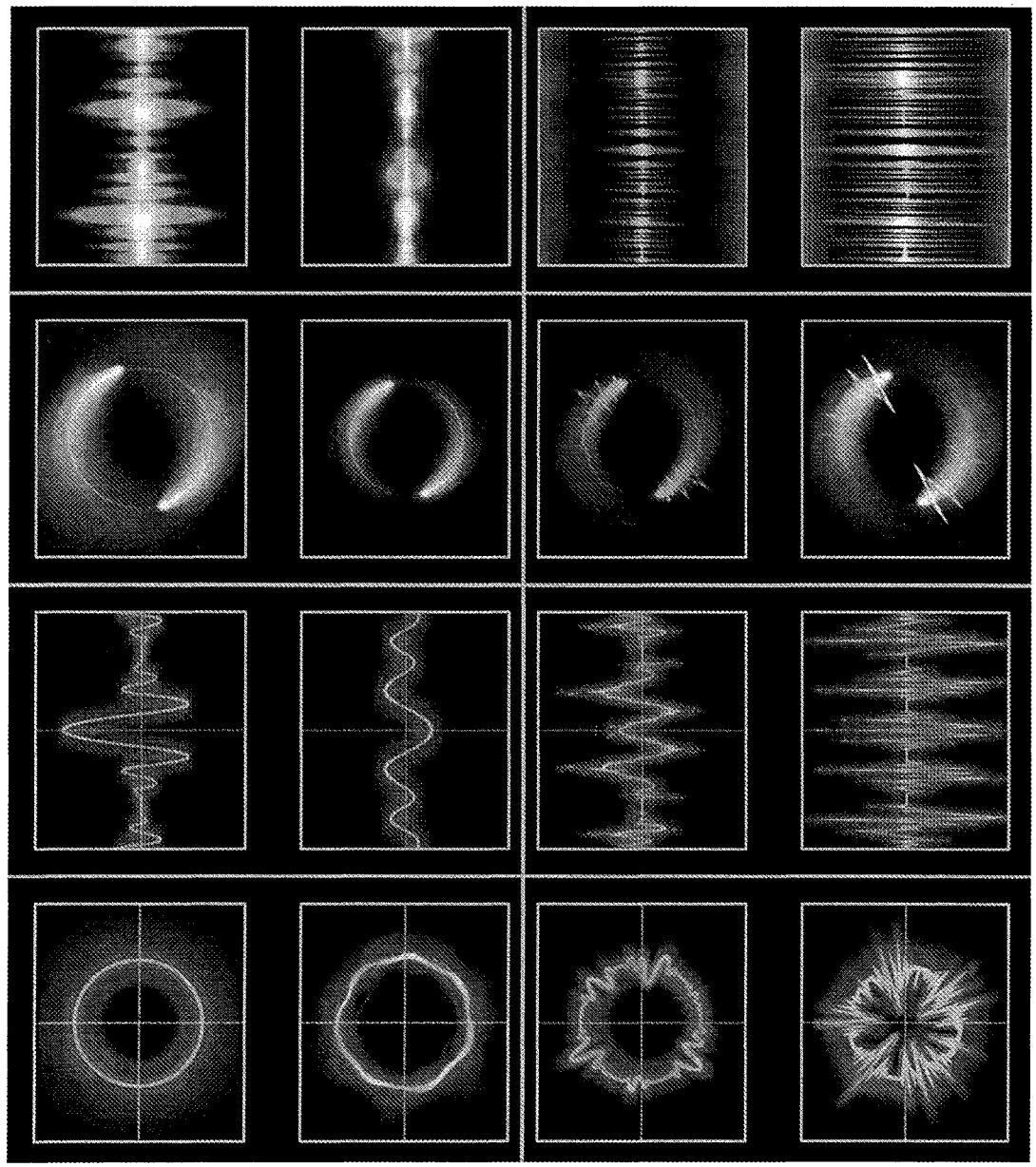
FIG. 6 shows examples of illumination patterns displayed by the display device.

FIG. 6 shows exemplary illumination patterns displayed by the center light unit 43. Examples of dynamic graphic patterns displayed by the center light unit 43 include a graphic pattern consisting of an approximately circular graphic that exhibits a heartbeat-like motion by alternately increasing and decreasing its diameter at a constant period. For such a graphic pattern, the period at which the diameter changes, or the outer shape of the graphic, may be varied depending on the information to be delivered.

The colors of illumination of the display device 201 (the light units 41L, 41R, 42L 42R, and 43) are set so that the impressions given by the colors match the contents of the pseudo-emotions to be delivered. For example, a green color may be used for delivery of a mild emotion, and a red color may be used for delivery of an intense emotion. In order to enable delivery of a wide variety of information, the display device may be configured so that not only the hue of the illumination colors, but also the tone (lightness and saturation) of the illumination colors and the amount of emitted light can be freely set.

The side light units 41L and 41R of the display device are disposed outwardly of the instrument unit 211 which displays a vehicle state in the vehicle width direction. Thus, information delivery by the display device 4 can be accomplished while reduction in visual recognizability of the instrument unit 211 is prevented. Since the side light units 41L and 41R are supported by existing components such as the mirror stays 213L and 213R, the windshield stay, and the edges of the windshield, any additional member for supporting the display device 4 is not required, and thus the construction of the display device can be simplified.

Additionally, since the display region of each of the side light units 41L and 41R and the front light units 42L and 42R is strip-shaped, the overall display region can be broadened. Thus, the visual recognizability of the display device 201 is high even when the driver fixes the centers of his/her eyes on the traveled road or the instrument unit 211. Additionally, since the display device 201 includes a pair of left and light units, the visual recognizability of the display device 4 is high even when the driver is looking either rightward or leftward.

Additionally, since the center light unit 43 of the present embodiment is disposed in the vicinity of the instrument unit 211, the center light unit 43 often appears in the field of view of the driver, thus enhancing the efficiency of information delivery to the driver. Additionally, since the center light unit 43 displays pseudo-emotions in the form of non-linguistic information, the driver can easily recognize the pseudo-emotions while checking the instrument unit 211. Since the center light unit 43 can vary all of the parameters including the color change, the shape pattern, and the shape change over time in association with each other depending on the information to be delivered, the visual recognizability for the driver can be improved even when the size of the display region is small. It is preferable to vary two or more parameters selected from the color change, the shape pattern, and the shape change over time. Depending on the information to be delivered, however, one of these parameters may be varied.

Although embodiments have been described above, any element may be modified, omitted, or added as appropriate within the scope of the present invention.

The conversation information to be delivered may be varied depending on the ease of driving or on whether the driver is performing smooth driving. When the conversation information is varied depending on the ease of driving, the varying of the conversation information may be based on the steering torque or the weight shift. Conversation information representing a stronger emotion of comfort may be output as the smoothness of driving and the smoothness of steering increase. Calculation formulae for quantifying the smoothness of driving and the smoothness of steering are not limited to particular ones. The smoothness of driving can be quantitatively evaluated based on a difference between an expected value of a parameter, which is estimated from the previous driving trend, and an actually measured value of the parameter.

The "emotion source information" may include environment information, vehicle setting information, identification information, and history information. The environment information includes, for example, information representing the location of the traveling vehicle, the inclination of the ground surface, the type of the traveled road, the geographical region, the temperature, the weather, the time of day, and the presence/absence of heavy traffic. The vehicle setting information includes information representing the stiffness of the suspensions and information representing components with which the vehicle is equipped. The identification information is information for identifying the vehicle or driver. The history information includes information representing the age of the vehicle and information representing the elapsed years from the previous vehicle inspection. The emotion generating section may receive feedback from the driver about the appropriateness or suitability of the generated pseudo-emotions and perform learning control for pseudo-emotion generation. In this case, the history information may be feedback information given by the driver.

The "emotion source information" may include driver response information. The driver response information may be generated based on voice information sensed by the microphone mounted on the headset. When it is determined, based on the driver response information (voice information), that the driver's response expresses the emotion of "delight" or "enjoyment", the pseudo-emotion to be delivered may be influenced by the driver's response and made more positive.

Although in the foregoing embodiments pseudo-emotions are generated based on both external forces applied by the driver and external forces applied from the ground surface, the generation of pseudo-emotions may be based on either external forces applied by the driver or external forces applied from the ground surface.

Other external forces applied to the vehicle from outside may also be used, and the other external forces include an air resistance derived from wind during travel, a force of crosswind, and a force applied from a rough ground surface in the upward/downward direction. When the air resistance or the crosswind is strong, an emotion of discomfort may be generated. Likewise, when a strong force is applied from a rough ground surface in the upward/downward direction, such as during travel on a stone-paved road, an emotion of discomfort may be generated. When the vehicle is running before the wind, an emotion of comfort may be generated. When the driver changes his/her driving posture to reduce the air resistance during travel at a high speed, an emotion of comfort may be generated.

Additionally, an emotion which would arise in a living creature subjected to an external force may be generated. An emotion reflecting the intention of the driver applying an external force may be generated. Conversation information may be set which is to be delivered when an external force is applied independently of the intention of the driver.

For example, a pseudo-emotion may be set based on a change in external force over time. For example, when the change in steering torque over time is small or when the trend of change remains the same as before, an emotion of comfort may be set.

A pseudo-emotion may be set based on the maximum value of an external force during a predetermined period or based on the integrated value of the external force over the predetermined period. A pseudo-emotion may be set based on the number of times at which an external force exceeds a predetermined level or based on the amplitude or frequency of the variation of the external force. When the change of the external force continues on the same trend, the pseudo-emotion to be set may be an emotion of relaxation.

For the skill evaluation, a skill evaluation method other than that described above may be used. For example, the degree of proficiency in gear shifting operation may be used for the skill evaluation. For example, the skill may be rated higher as the engine speed is more smoothly adjusted during gear shifting. The skill may be rated higher as the leaning of the vehicle body during cornering is larger.

As to external force application by the driver, external force patterns created by a skilled driver for different situations or exemplary external force patterns for different situations may be stored in memory. Once the pattern in which the driver applies an external force comes close to the skilled driver's external force pattern or the exemplary external force pattern, a positive emotion may be output. Conversation information may be output as information for assisting the driver to improve his/her driving skill.

When a frequently appearing external force pattern is formed, such as when similar external force patterns are formed a given number of times or more, an emotion of familiarity may be generated. When an infrequently appearing external force pattern is formed, an emotion of nervousness may be generated.

Conversation information may be output based on both information related to the traveled road and external force patterns. This enables conversation information output reflecting the difference in external force pattern depending on the travel situation. Differences between travel situations may include the difference in traveled road, the difference in the type of traveled ground surface, and the difference in time of day.

Conversation information may be output based on both the driver driving the vehicle and external force patterns. This enables conversation information output reflecting the difference in external force pattern depending on who the driver is.

REFERENCE CHARACTERS LIST

1 Pseudo-emotion generating system
11 Emotion generating section
12 External force information acquiring section
13 Skill evaluating section
14 Driver emotion generating section

The invention claimed is:
1. A vehicle pseudo-emotion generating system configured to generate pseudo-emotions, the system comprising:

an emotion generating section that generates a pseudo-emotion based on external force information representing an external force applied to a vehicle from outside during travel, wherein the external force information includes ground surface-derived external force information representing an external force applied to a ground-contacting portion of a drive wheel of the vehicle from a ground surface during travel of the vehicle, the emotion generating section generates the pseudo-emotion based on a margin for slip of the drive wheel, and the vehicle pseudo-emotion generating system is configured to modify an output of the vehicle in a manner related to the generated pseudo-emotion.

2. The vehicle pseudo-emotion generating system according to claim 1, wherein the external force information includes driver-derived external force information representing an external force applied to the vehicle by a driver during travel of the vehicle.

3. The vehicle pseudo-emotion generating system according to claim 2, wherein the vehicle is operable to turn a corner in a state where a vehicle body of the vehicle is leaned, and the driver-derived external force information includes information related to a torque applied by the driver about a steering axis.

4. The vehicle pseudo-emotion generating system according to claim 1, wherein the external force information includes driver-derived external force information representing an external force applied to the vehicle by a driver during travel of the vehicle, and the driver-derived external force information includes information related to a force applied to the vehicle body upon a change in posture of the driver.

5. The vehicle pseudo-emotion generating system according to claim 1, wherein the vehicle is operable to turn a corner in a state where a vehicle body of the vehicle is leaned, and the external force information includes information related to a torque applied by a driver about a steering axis.

6. The vehicle pseudo-emotion generating system according to claim 1, further comprising a skill evaluating section that evaluates driving skill of a driver, wherein the emotion generating section generates the pseudo-emotion based on the driving skill evaluated by the skill evaluating section.

7. The vehicle pseudo-emotion generating system according to claim 1, further comprising:

a display device provided in a vehicle body of the vehicle and disposed to be viewable by a driver assuming a driving posture; and a display control section that controls the display device, wherein the display control section causes the display device to operate to display different illumination patterns depending on the pseudo-emotion generated by the emotion generating section.

8. The vehicle pseudo-emotion generating system according to claim 7, wherein the display device comprises a side light unit disposed outwardly of an instrument unit that displays a vehicle state in a vehicle width direction.

9. A vehicle pseudo-emotion generating system configured to generate pseudo-emotions, the system comprising:

an emotion generating section that generates a pseudo-emotion based on external force information representing an external force applied to a vehicle from outside during travel of the vehicle;

a display device provided in a vehicle body of the vehicle and disposed to be viewable by a driver assuming a driving posture; and a display control section that controls the display device, wherein the display control section causes the display device to operate to display different illumination patterns depending on the pseudo-emotion generated by the emotion generating section, the display device comprises a side light unit disposed outwardly of an instrument unit that displays a vehicle state in a vehicle width direction, and the side light unit comprises a pair of side light units disposed outwardly of the instrument unit in the vehicle width direction.

10. The vehicle pseudo-emotion generating system according to claim 7, wherein the display device displays the different illumination patterns by changing at least one of color, blinking rate, and order of turning on.

11. The vehicle pseudo-emotion generating system according to claim 1, further comprising a skill evaluating section that evaluates driving skill of a driver, wherein the margin is a margin of the ground surface-derived external force information to a tire grip limit, the skill evaluating section evaluates the driving skill based on the ground surface-derived external force information and a friction circle indicating the tire grip limit, and the emotion generating section generates the pseudo-emotion based on the driving skill evaluated by the skill evaluating section.

12. A conversation information output method for outputting conversation information to a driver driving a vehicle, the method comprising:

acquiring external force information representing an external force applied to the vehicle from outside during travel of the vehicle; and outputting conversation information based on the acquired external force information, wherein the external force information includes ground surface-derived external force information representing an external force applied to a ground-contacting portion of a drive wheel of the vehicle from a ground surface during travel of the vehicle, and the outputting the conversation information is performed based on a margin for slip of the drive wheel.

* * * * *